United States Patent
Ciet et al.

(10) Patent No.: US 8,200,986 B2
(45) Date of Patent: Jun. 12, 2012

(54) COMPUTER ENABLED SECURE STATUS RETURN

(75) Inventors: Mathieu Ciet, Paris (FR); Augustin J. Farrugia, Cupertino, CA (US); Gianpaolo Fasoli, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 767 days.

(21) Appl. No.: 12/109,283

(22) Filed: Apr. 24, 2008

(65) Prior Publication Data

US 2009/0271636 A1    Oct. 29, 2009

(51) Int. Cl.
*G06F 11/30* (2006.01)

(52) U.S. Cl. .............. 713/189; 380/30; 380/37; 380/46; 380/277; 713/153

(58) Field of Classification Search .................. 713/189, 713/153; 380/30, 37, 46, 277
See application file for complete search history.

(56) References Cited

U.S. PATENT DOCUMENTS

| | | | | |
|---|---|---|---|---|
| 6,038,321 | A * | 3/2000 | Torigai et al. | 380/268 |
| 6,119,227 | A * | 9/2000 | Mao | 713/171 |
| 7,539,875 | B1 * | 5/2009 | Manferdelli et al. | 713/189 |
| 7,831,827 | B2 * | 11/2010 | Walmsley | 713/168 |
| 2007/0140478 | A1 * | 6/2007 | Komano et al. | 380/28 |

* cited by examiner

*Primary Examiner* — Brandon Hoffman
*Assistant Examiner* — Samuel Ambaye
(74) *Attorney, Agent, or Firm* — Morrison & Foerster LLP

(57) ABSTRACT

Computer related method and apparatus to transmit a logical value (e.g., 1 or 0) between two entities, such as an operating system and application program, in a secure way in an insecure environment. The logical status is sent by in effect encrypting it using two random numbers, one from each entity, before sending it to the other entity. However the encrypting is much "lighter" (requiring much less computer or circuit resources) than any conventional secure cipher and has a built-in verification feature.

18 Claims, 2 Drawing Sheets

COMPUTER ENABLED SECURE STATUS RETURN

FIELD OF THE INVENTION

This invention relates to computers, computing devices, and data security.

BACKGROUND

For a large set of software applications (program) it is necessary to answer a logic statement Yes or No. Yes and No are typically expressed in the computer field by respectively a binary 0 or a 1. This type of answer ("return") is for instance the case when a digital signature is verified to answer if the signature has been determined to be valid or not.

For inside a secure computing environment it is possible simply to transmit this logic Yes/No status as a Boolean value of 1 or 0. In a non-secure computing environment, a block cipher can for instance be used to encrypt the Boolean value for transmission. This is often done with the addition of a random number, to avoid the well known replay type attacks.

However, for some applications use of a block cipher is impossible due to the length of execution time and software code size required for a block cipher or equivalent. For instance, many consumer electronic devices do not have adequate processing ability to handle a block cipher (which is complex), but do require data security.

SUMMARY

This disclosure describes a solution to transmit a Boolean status in a secure way using a "light" but secure method related to encryption but not using a cipher. This is intended for a "light" (small code size or few logic gates) implementation.

DETAILED DESCRIPTION

The Boolean logic status exchange (transmission) in accordance with the invention is done as follows. In one example the Boolean status is transmitted between a computer operation system referred here to as "Part1" and a software application referred here to as "Part2" running on that operating system in a computer or computing device environment. But, that is not limiting; in another example the Boolean status is transmitted between two different computers or other types of computing devices. Suppose Part1 (the operating system) needs to obtain a Boolean response from Part2 (the application). The method is shown in FIG. 1 where time is the vertical axis and each column shows the activity at respectively Part1 and Part2.

Figure 1:
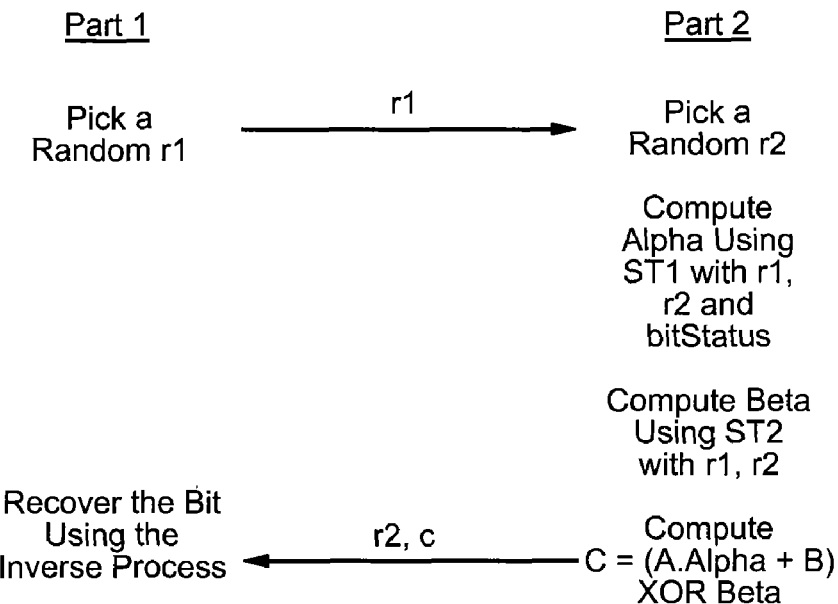
FIG. 1 shows the present method diagrammatically.

The functions of FIG. 1 are as follows:
ST2 (State 2) is obtained as being, for example:
a) $((r1 \| r2)^2 \text{ modulus } 2^{128}+51) \text{ modulus } 2^{128}$, or
b) $(a \cdot (r1 \| r2)+b) \text{ modulo } 2^{128}$ XOR K1, where "$\|$" designates concatenation and "XOR" is the Boolean (logic) exclusive OR operation. a, b and K1 are constants, see below. The random numbers r1, r2 may be generated by a true random number generator or a pseudo-random number generator. Values r1, r2 are for example 64 bits long expressed in binary form.

Figure 2:
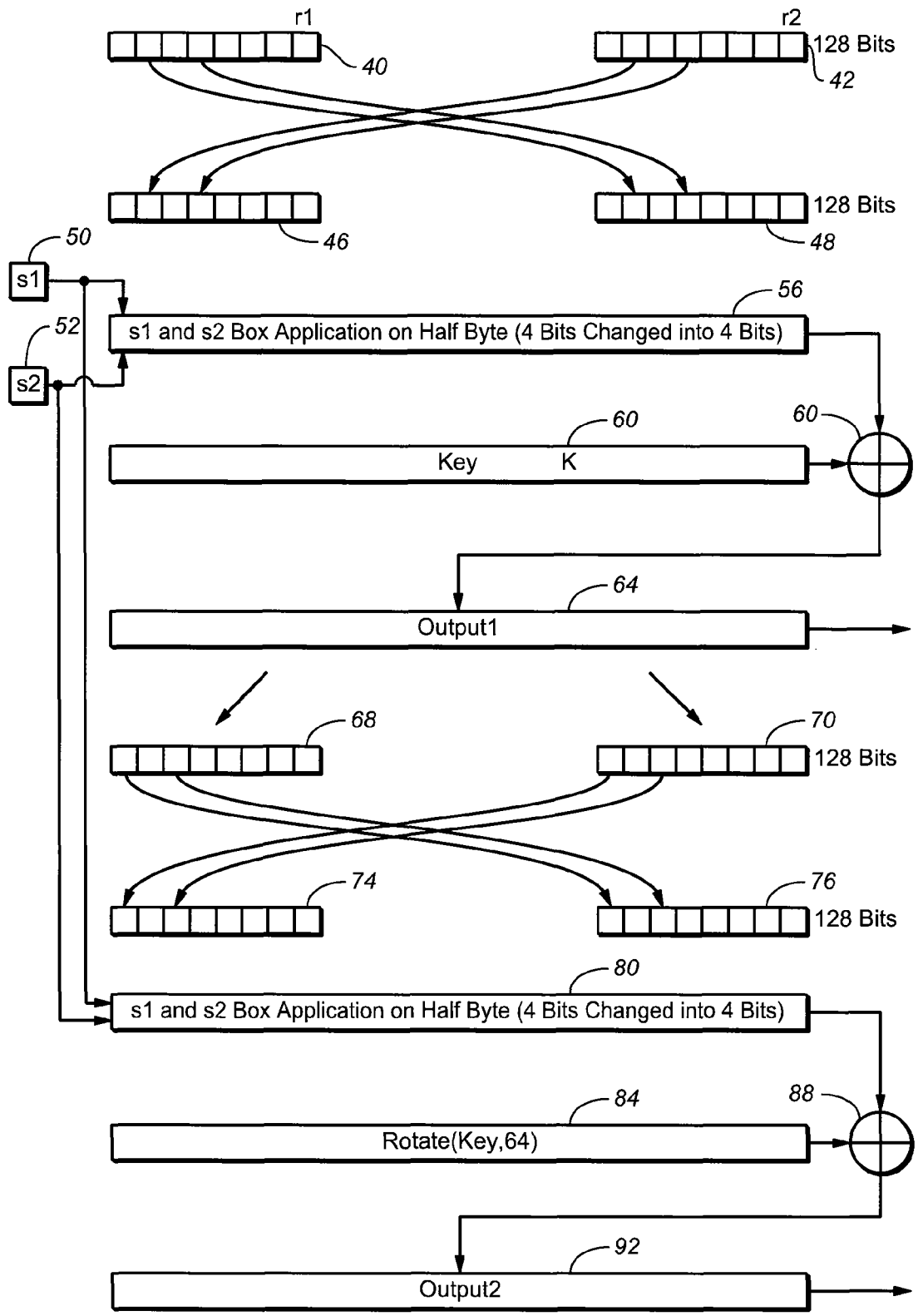
FIG. 2 shows how to determine ST1 for use in the FIG. 1 method.

ST1 (State 1) is obtained by the method and apparatus depicted in FIG. 2. This generates a value having 256 binary bits. If the bit status of the Boolean logic value to be returned from Part2 to Part1 is 0, then only the even bits of ST1 are taken to generate Alpha of FIG. 1. If the bit status of the Boolean logic value to be sent is 1, then only the odd bits of ST1 are taken to generate Alpha. Note that this example uses bits, but can easily be extended to bytes or words.

In FIG. 2, one starts with two random numbers (from e.g. a pseudo or true random number generator) r1, r2 stored in respective storage elements (e.g., registers) 40, 42. These are then in effect "flipped" as shown (r1 for r2, r2 for r1) and restored in storage elements 46, 48. S-boxes s1, s2 (which are stored in respective storage elements 50, 52) are then applied to r2, r1 by a calculation element 56. S-box s-1 is applied then s-box s-2, then again s-1 then s-2 to the nibble of the constructed values to achieve a value 128 bits long. There are additional s-boxes in other embodiments. A cryptographic key K (not the same as constant K1 above) is stored in its storage element 56 and logically XOR'd (exclusive OR operation) at element 60 with the result of the S-box application. The result of the XOR operator 60 is stored in the first output storage element 64, as output1 and also partitioned into two and stored in storage elements 68, 70.

The contents of storage elements 68, 70 are flipped as shown and stored in elements 74, 76. The contents of 74, 76 have the same S-box operations of s1, s2 applied at 80. A 64 bit-shift rotated version of key K is stored at 84, and logically XOR'd at 88 with the result of operation 80. The result is the second half of the output (output2) stored at 92. FIG. 2 shows (right hand column) in this example how many bits are being stored in each storage element or set of storage elements, which here is 128 bits.

The s-box st (first substitution box—which implements a substitution operation of the type well known for use in block ciphers) of FIG. 2 (working on 4 input bits) can be expressed in hexadecimal in one embodiment as {0x3, 0x5, 0xf, 0xd, 0x0, 0xe, 0xi, 0xa, 0x6, 0x2, 0xc, 0x4, 0x7, 0x9, 0xb, 0x8}; the s-box s2 (second substitution box) can be expressed as {0x5, 0xe, 0x1, 0x2, 0x4, 0x9, 0xb, 0xc, 0x0, 0xf, 0x3, 0x8, 0xa, 0x6, 0xd, 0x7}. These s-boxes are merely exemplary.

Values A, B, a, b. K1 and the key of FIG. 2 can be fixed and secret and are integers. The only other restriction is that A and a are odd integers. Suitable exemplary values are: A=3 or A=5 and a=5 or a=7. B, b, k1 and the key for ST1 of FIG. 2 in one embodiment are built ("hardwired") into the software/hardware executing the process of FIGS. 1 and 2 and are each, e.g., 128 bits long when expressed as binary numbers.

If A=3 then the inverse of A is expressed in hexadecimal as
$A^{-1}$=0xaaaaaaaaaaaaaaaaaaaaaaaaaaaaaaab
If A=5 then $A^{-1}$=0xcccccccccccccccccccccccccccccccd
where $A^{-1}$ is the inverse of A modulo $2^{128}$.

At the end of the second XOR operation of FIG. 2 (where the XOR operation is expressed there by the "+" operator) the two blocs of 128 bits (output1 and output2) are concatenated which yields a 256 bit bloc output.

The process of FIG. 1 can be summarized as:
The transmitted messages in FIG. 1 are:
1. From Part1 to Part2: send number r1
2. From Part2 to Part1: send numbers r2 and C
The Boolean status of Part2 is extracted on the Part1 side of FIG. 1 from C, by recovering Alpha' from C as follows:
1. Recover Beta from r2
2. (C XOR Beta)−B=A·Alpha 3. Alpha'=A·Alpha·A$^{-1}$, where · is the multiplication operation. This operation may be done modulo any other value.

4. At this point Alpha' is determined from expression 3.

Part1 can then compute ST1 from r1, r2 as in FIG. 2 and then compares the ST1 even bytes or odd bytes to value Alpha'. If neither of the full sets of 16 bytes (128 bits) match, then there has been a transmission error of r1, r2, or C between Part1 and Part2 in FIG. 1. This can be an indication of corruption. Otherwise (if no transmission error is found by the comparison), Part1 is able to know securely what is the Boolean logic status of Part2.

The present method thereby provides transmission of a Boolean status in a secure way and has the advantage of being implementable in a constrained ("light") environment in terms of available computing resources. This approach is more compact in terms of software code length (or logic gates in a hardware implementation) than most the block ciphers. The method is less secure than a classical block cipher but is intended primarily for purposes as described here which are different than that of block ciphers. One useful feature is the possibility of error detection as indicated above since the two possible answers are both recovered on the Part1 side and a set of comparisons is performed for verification. The present method may be embodied in computer code coded in, e.g., the C++ computer language, to be executed on a processor. Coding such code or embodying it in logical gates would be routine in light of this disclosure. Also contemplated is a computer or computing device programmed to execute the code, and a computer readable medium storing such code. In other embodiments the method is embodied entirely or in part as logic circuitry.

Figure 3:
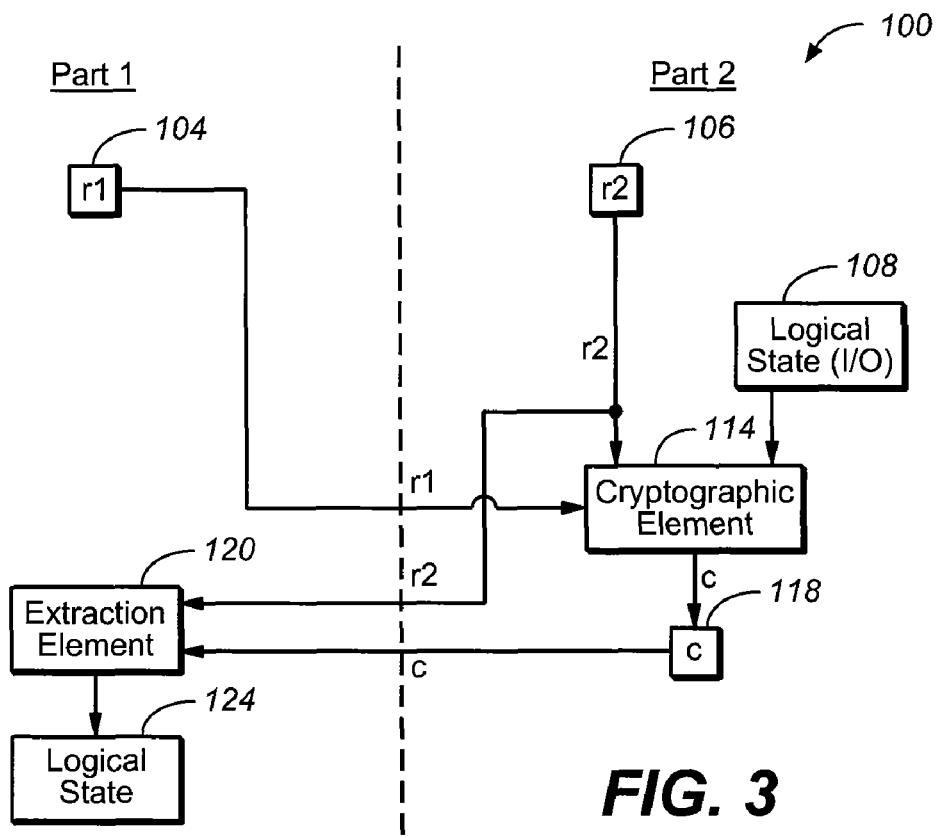
FIG. 3 shows an apparatus for the FIG. 1 method.

FIG. 3 shows an apparatus 100 in a block diagram for carrying out the FIG. 1 method in hardware or software. Apparatus 100 includes (as in FIG. 1) Part1 and Part2 (partitioned as indicated by the broken line), with respective sources 104, 106 of r1, r2, such as a memory (storage) element or random number generator. Source 104 of r1 is coupled to Part2 via a suitable communications channel. Part2 also has memory element 108 storing its logical state to be returned to Part1. Cryptographic element 114 computes C from r1, r2, the logical state at 108, and the various constants shown above in FIGS. 1 and 2, and outputs value C to its output storage element 118. Storage element 118 and source 106 of r2 are coupled via the communications channel to the extractor 120 in Part1, which as shown above extracts the logical state of Part2 from C using r2 and stores the extracted logical state in storage element 124, and if need be performs the verification as described above.

This disclosure is illustrative but not limiting; further modifications will be apparent to those skilled in the art in light of this disclosure, and are intended to fall within the appended claims.

The invention claimed is:

1. A computer enabled method to securely transmit a single bit logical state from a second entity to a first entity, comprising the acts of:
   selecting a first random value at the first entity and a second random value at the second entity; wherein each of the entities is a computer operating system, a software application, a computer or a computing device;
   communicating an unprotected version of the first random value to the second entity;
   computing at the second entity a first value from the first and second random values and the logical state of only a single bit of the second entity using a cryptographic process;
   communicating the first value and an unprotected version of the second random value to the first entity;
   at the first entity, extracting the single bit of the logical state from the first value using the second random value;
   at the first entity, applying a test to the received first value and second random value; and
   determining from the test if there has been a transmission error;
   wherein the communicating between the entities does not use a cipher.

2. The method of claim 1, wherein the random values are generated by a pseudo random process.

3. The method of claim 1, wherein the logical state is a Boolean value.

4. The method of claim 1, wherein the cryptographic process uses a key.

5. The method of claim 1, wherein the cryptographic process uses at least one substitution box.

6. The method of claim 1, wherein the cryptographic process uses a flip operation.

7. The method of claim 4, wherein the cryptographic process uses a rotation of the key.

8. The method of claim 1, wherein the communicating is over one of a:
   computer system bus;
   integrated circuit bus;
   computing device bus;
   computer network; or
   processor bus.

9. The method of claim 1, wherein the first value is designated C and is computed as C=(A·α+B) XOR β, A being a constant, β being a function of the first and second random values, and α being a cryptographic function of the logical state of the second entity.

10. The method of claim 9, β being equal to a value selected from the group consisting of:
   ((r1||r2)$^2$ modulus $2^{128}$+51) and
   ((a·(r1||2) modulus $2^{128}$+b) modulus $2^{128}$) XOR K1
   where r1, r2 are the first and second random values, and a, b and K1 are numbers.

11. The method of claim 10, wherein a, b and K1 are kept secret.

12. The method of claim 9, where a is generated by a process including:
   (a) providing the first and second random values respectively r1, r2;
   (b) concatenating r1 to r2;
   (c) applying a first and a second substitution box to the concatenated r2 and r1;
   (d) exclusive ORing a key value with a result of the substitution box application;
   (e) splitting a result of (d) and concatenating the result;
   (f) applying the first and second substitution boxes to a result of (e);
   (g) exclusive ORing a rotation of the key value with a result of (f); and
   (h) providing as a result the results of (d) and (g).

13. The method of claim 12, wherein if the logical state of the single bit of the second entity is a first state, a is equal to the even bits of (h) of claim 12, and if the logical state is a second state, a is equal to the odd bits of (h) of claim 12.

14. The method of claim 12, wherein the substitution boxes are each 4 bits input and 4 bits output.

15. The method of claim 12 wherein the first substitution box expressed in hexadecimal is {0x3, 0x5, 0xf, 0xd, 0x0, 0xe, 0xi, 0xa, 0x6, 0x2, 0xc, 0x4, 0x7, 0x9, 0xb, 0x8}, and the second substitution box is {0x5, 0xe, 0x1, 0x2, 0x4, 0x9, 0xb, 0xc, 0x0, 0xf, 0x3, 0x8, 0xa, 0x6, 0xd, 0x7}.

16. The method of claim 9, wherein the act of extracting includes:
   recovering β from r2;
   calculating C XOR β−B=A·α; and
   calculating α'=A·α·A$^{-1}$
   where α' is the inverse of α.

17. A non-transitory computer readable medium storing computer code for carrying out the method of claim 1.

18. Apparatus for securely transmitting a single bit logical state from a second portion to a first portion within the apparatus, the apparatus comprising:
   a first source of a first random number associated with the first portion;
   a second source of a second random number associated with the second portion, wherein each of the portions is a computer operating system or a software application;
   a first storage element which stores the logical state;
   a communications channel coupled to the first source to communicate an unprotected version of the first random number to the second portion;
   a cryptographic element coupled to the second source, the communications channel, and the first storage element, and which determines a first value from the first and second random values and only a single bit of the logical state;
   an output storage element coupled to the cryptographic element and which stores the first value;
   wherein the output storage element and the second storage element are coupled to the communications channel to communicate the first value and an unprotected version of the second random value to the first portion;
   an extraction element associated with the first portion and coupled to the communications channel to extract the single bit of the logical state from the first value using the second random value; and applying a test to the first value and second random number; and determining from the test if there has been a transmission error;
   wherein no cipher is used in communicating the first random number, the first value, or the second random number between the portions.

* * * * *